(No Model.) 5 Sheets—Sheet 1.
M. L. DEERING.
MACHINE FOR MOLDING PULP.

No. 455,097. Patented June 30, 1891.

WITNESSES:
INVENTOR:
Mark L. Deering.
BY D. A. Carpenter,
ATTORNEY.

(No Model.) 5 Sheets—Sheet 2.
M. L. DEERING.
MACHINE FOR MOLDING PULP.

No. 455,097. Patented June 30, 1891.

WITNESSES:
Russell A. Bigelow.
Mortimer V. Smith.

INVENTOR:
Mark L. Deering,
BY
D. A. Carpenter
ATTORNEY.

(No Model.) 5 Sheets—Sheet 3.
M. L. DEERING.
MACHINE FOR MOLDING PULP.
No. 455,097. Patented June 30, 1891.
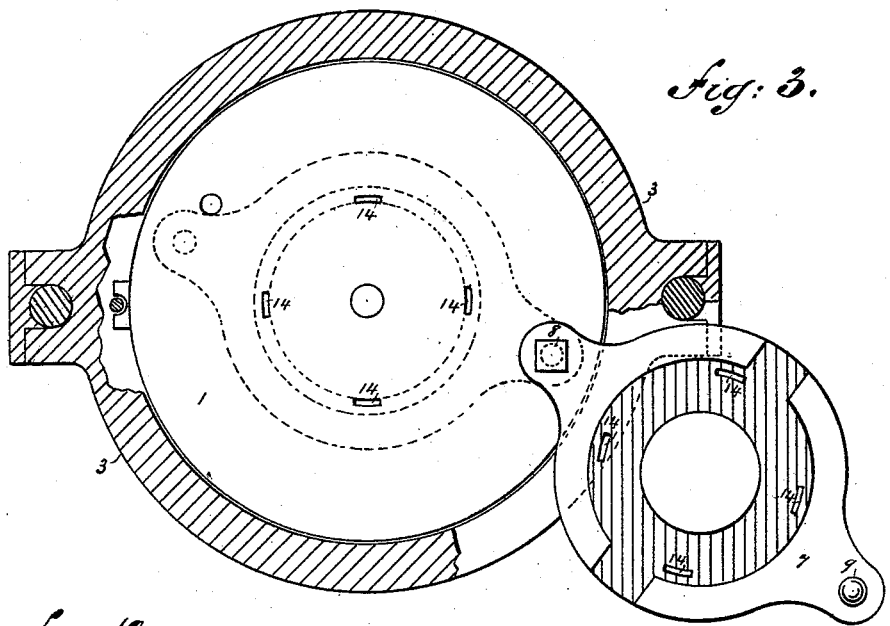
Fig: 3.
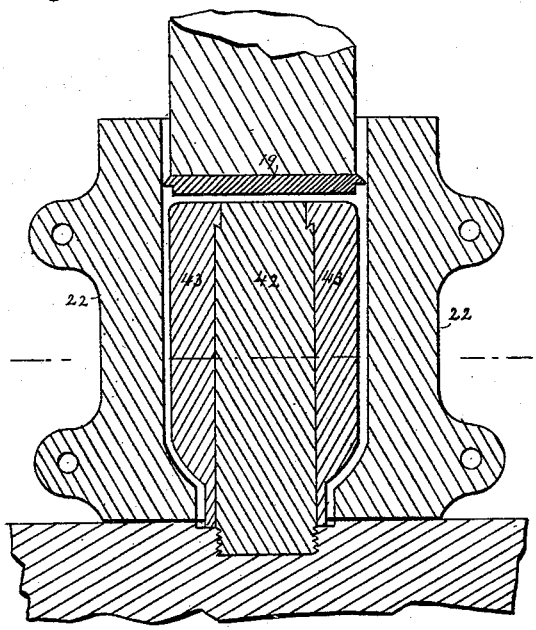
Fig: 12.
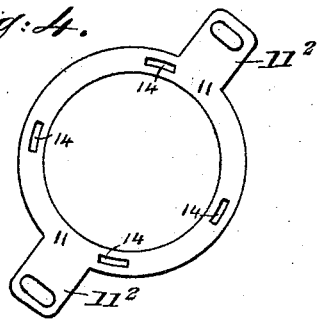
Fig: 4.
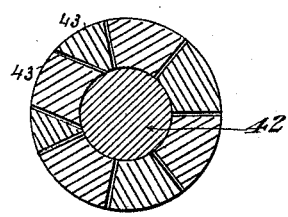
Fig: 13.
WITNESSES:
Russell A. Bigelow,
Mortimer V. Smith
INVENTOR:
Mark L. Deering,
BY
D. A. Carpenter,
ATTORNEY.

(No Model.) 5 Sheets—Sheet 4.

M. L. DEERING.
MACHINE FOR MOLDING PULP.

No. 455,097. Patented June 30, 1891.

WITNESSES:
Russell A. Bigelow,
Mortimer V. Smith

INVENTOR:
Mark L. Deering,
BY
D. A. Carpenter
ATTORNEY.

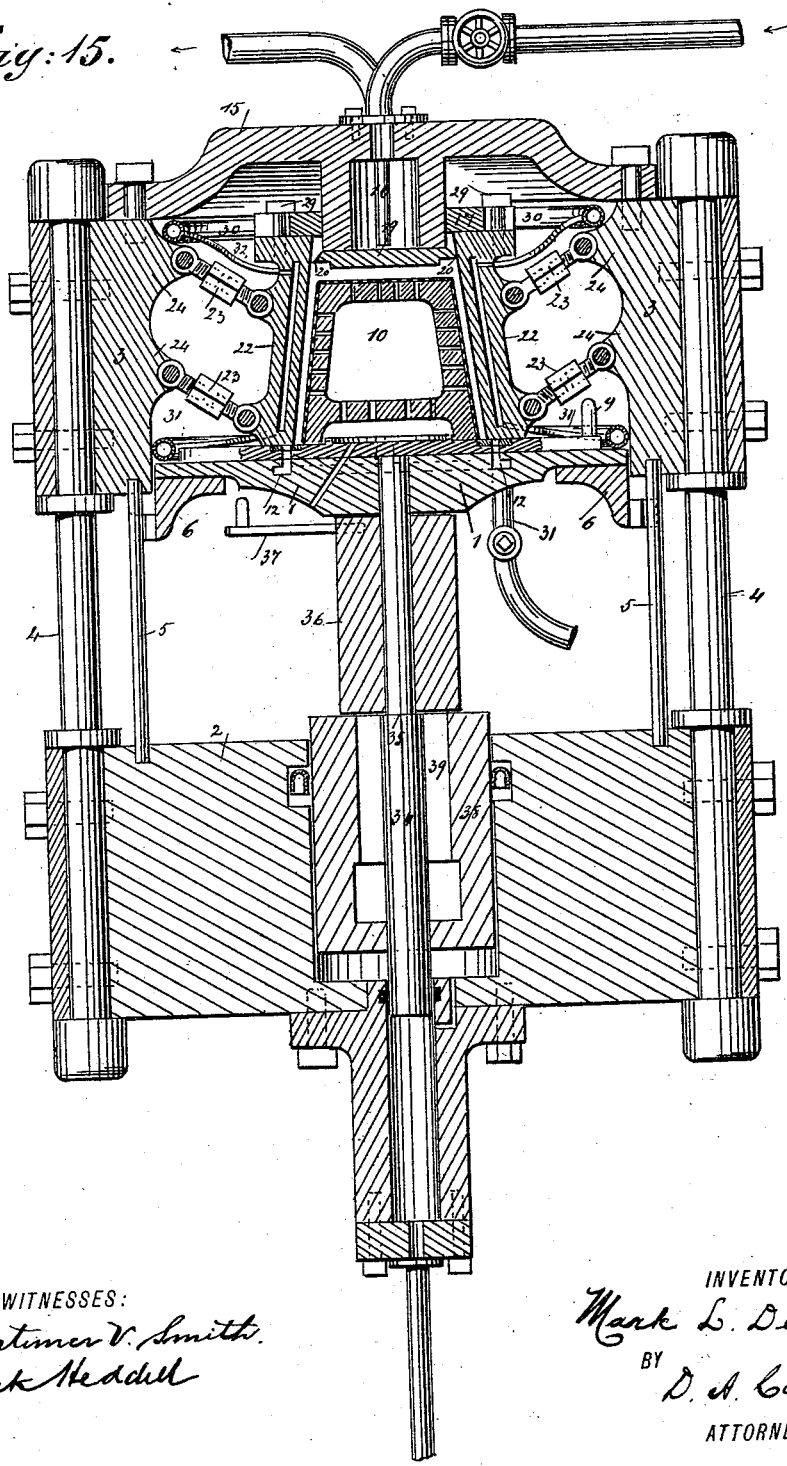

UNITED STATES PATENT OFFICE.

MARK L. DEERING, OF CLEVELAND, OHIO.

MACHINE FOR MOLDING PULP.

SPECIFICATION forming part of Letters Patent No. 455,097, dated June 30, 1891.

Application filed May 14, 1890. Serial No. 351,776. (No model.)

*To all whom it may concern:*

Be it known that I, MARK L. DEERING, of Cleveland, in the county of Cuyahoga and State of Ohio, have invented a certain new and useful Improvement in Machines for Molding Pulp, of which I declare the following to be a full, clear, and exact description, reference being had to the accompanying drawings, forming part of this specification.

This invention relates to improvements in machinery whereby wood pulp or similar material may be molded and pressed into the form of hollow articles, such as pails, cans, boxes, &c.; and the invention consists of a machine having its several parts constructed and combined substantially as is herein described and claimed.

Figure 1:
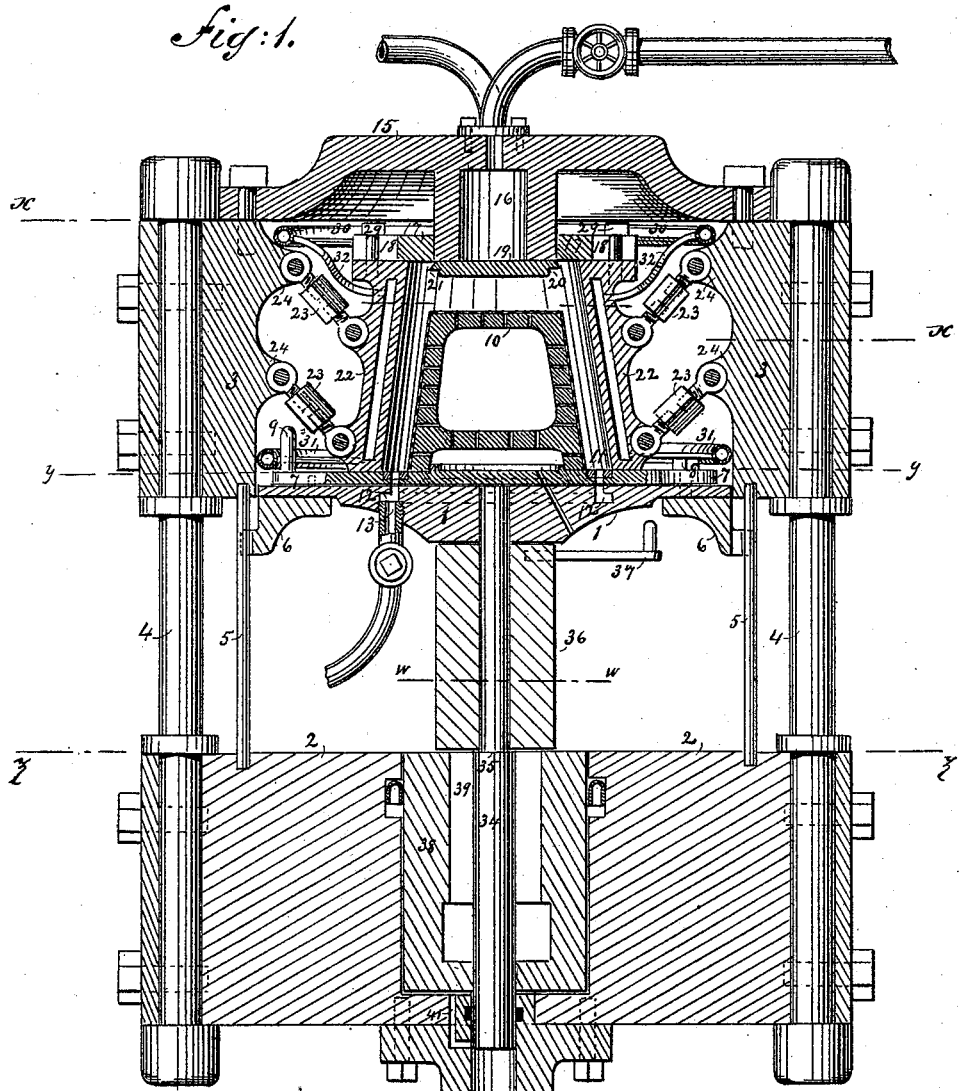
Figure 2:
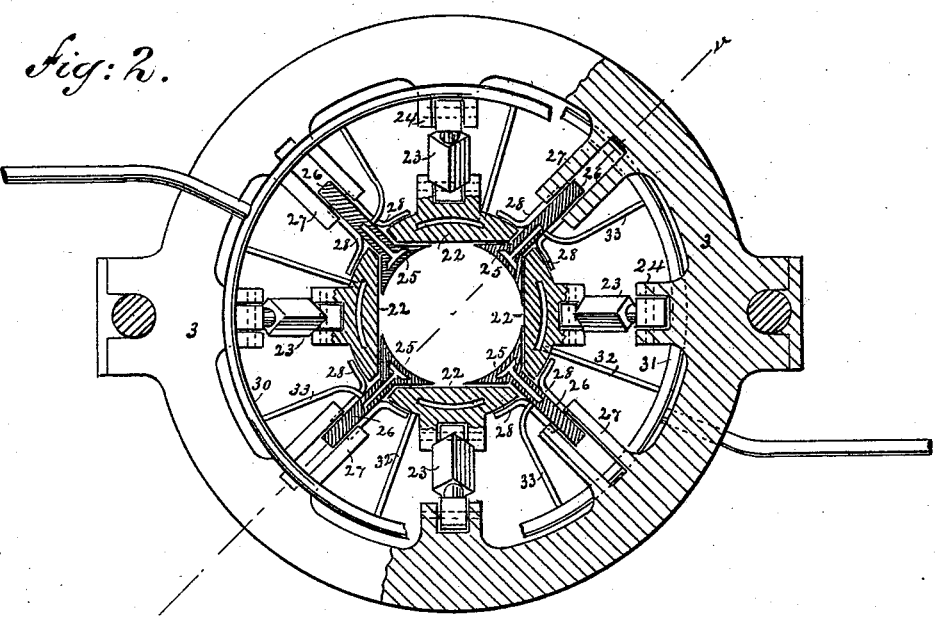
Figure 5:
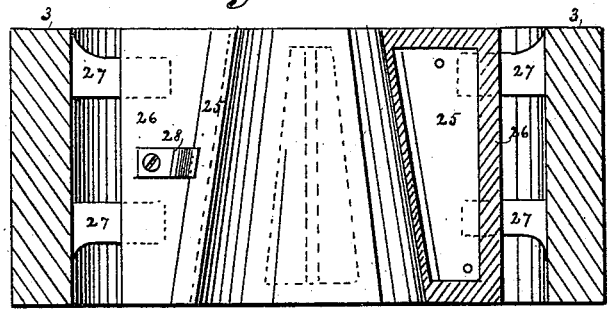
Figure 7:
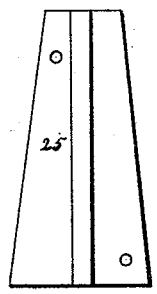
Figure 6:
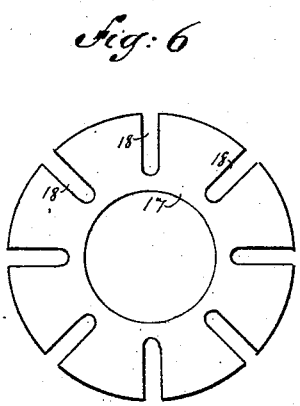
Figure 8:
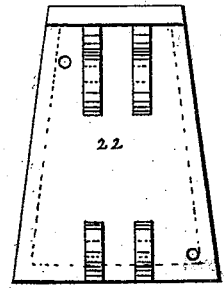
Figure 14:
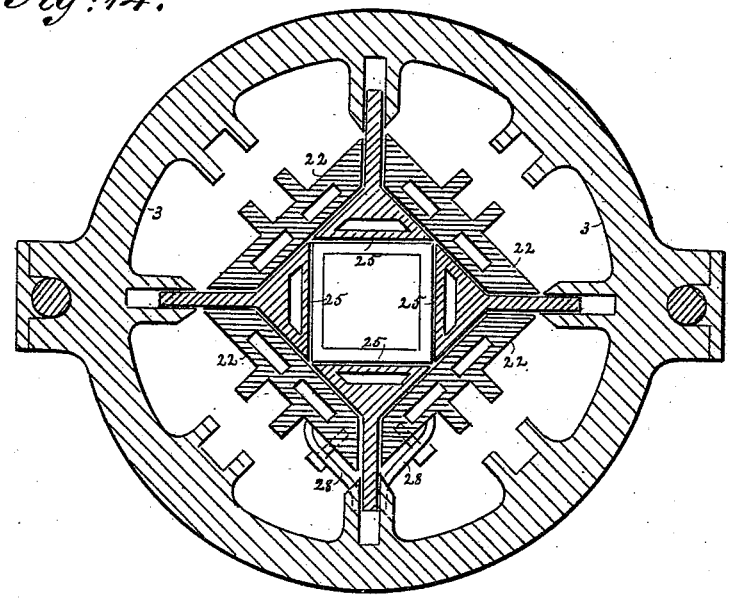
Figure 9:
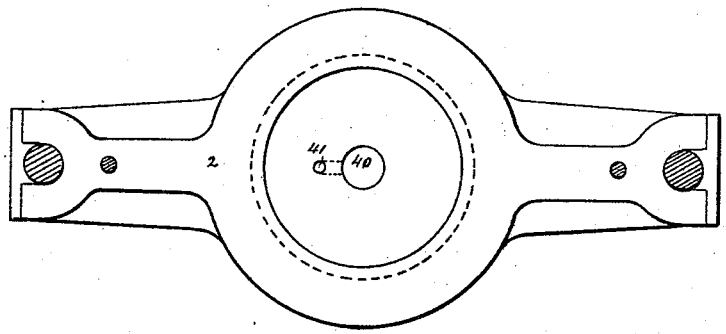

In the accompanying sheets of drawings, Figure 1 is a vertical section of the machine with the mold ready to be filled; Fig. 2, a horizontal section of the mold and surrounding casing in the planes $x\ x$, Fig. 1; Fig. 3, a horizontal section of the casing in the plane $y\ y$, Fig. 1, and plan of the platform; Fig. 4, a face view of lifting-ring; Fig. 5, a vertical section of the casing and part of mold in the plane $v\ v$, Fig. 2; Fig. 6, a plan of sliding plate. Figs. 7 and 8 are details of movable mold-sections. Fig. 9 is a plan of the base, the columns and platform-guides being shown in section in the plane $z\ z$, Fig. 1. Figs. 10 and 11 are cross-sections in the plane $w\ w$, Fig. 1, of parts of the lifting mechanism. Fig. 12 is a vertical section of the mold with a collapsible core. Fig. 13 is a cross-section of the collapsible core. Fig. 14 is a cross-section of the mold adapted to form a box. Fig. 15 is a vertical section of the machine, showing the parts of the mold in their respective positions at the end of the operation of forming the article.

Similar reference-numbers indicate like parts in the several views.

The object of this invention is to simplify the machinery required for the manufacture of seamless hollow articles from pulp and to enable these to be made of better quality than heretofore with a considerable saving of time and material. This machine, like that in which a rubber bag is used for compressing the pulp, causes the pressure to be everywhere applied to the mass of pulp in a direction substantially at right angles to its surface, thus enabling a uniform density to be imparted to all parts of the article formed, and since the outer wall of the mold of this machine is rigid instead of flexible it will produce an even surface and can be made of material not liable to wear out faster than other parts of the machine and can be forced to contract about the pulp with as much promptness and precision as any other portion of the machine can act, and, besides, the mold can be heated, so that the article can be dried in the mold and will be ready when it is taken out of the mold to be smoothed and finished.

The machine is adapted to work by hydraulic power. This is applied to a platform which is arranged to travel up and down, and through which motion is transmitted to other parts of the machine above the platform. This platform is marked 1 on the drawings. It travels through a space extending from the casting 2, which may be termed the "base," into the hollow casting 3 above this, these castings being secured on the columns 4 4, as shown. Guides 5 5 and lugs 6 6 help to keep the platform in the proper position.

On the platform is a plate 7, which turns about a pivot 8, passing through it near its edge into the platform, and is provided with a handle 9, and on the plate 7 is a hollow former 10 of a size and shape corresponding to the interior of the article to be produced. The former, like those similar to it in other machines, has shallow grooves in its outer surface at short distances apart, and numerous small holes through its sides and top connecting the grooves with the space inside the former, and is covered with perforated sheet metal or wire-gauze. When the platform is elevated, the former 10 projects up into the hollow casting 3; also, on the plate 7 is a removable ring 11, having handles $11^2$. This ring fits snugly around the base of the former 10 and rests in a bed in the plate 7. The handles $11^2$ consist of projections on opposite sides of the ring of the same thickness as the body of the ring, so that the ring with the handles will lie flush with the upper surface of the plate 7, with the handles extending beyond the edge of the plate in front and behind.

In the platform is an annular channel 12, with an opening 13 leading into it on the under side of the platform, and several openings 14 are made through the plate 7 and ring 11 above the channel. A space at least equal in width to the thickness of the sides of the article to be molded should be left between the openings 14 and the inner edge of the ring 11.

On the casting 3 is screwed or bolted the top 15, and these parts constitute what will be called the "dome." A hollow hub 16 projects downward on the under side of the top, and a plate 17, having eight slots 18 at equal distances apart extending from the outer edge toward the center of the plate, is arranged to slide vertically on this hub. The lower end of the hub is covered by a plate 19 of steel, which projects beyond the sides of the hub and has a rabbet 20 and a cutting-edge 21, and to the hub are attached inlet and outlet pipes. This hub, with the plate 19 secured thereto, serves as a head-block, against which pressure is directed by the top of the former.

The former 10 furnishes the inner wall for the mold, and the outer wall is made by the plate 19 and a system of eight movable sections which surround the former when this is within the dome. Four of these sections 22 have pivoted to them pairs of adjustable links 23, one link of each pair being directly above the other, and each pair of links is also pivoted to lugs 24 on the inside of the casting 3. The links extend obliquely upward from the sections to the casting. The other four sections 25 alternate with the sections 22, and each of the sections 25 extends in front of the sections adjacent to it and is reduced to a thin edge on each side. Each of the sections 25 has on its back a projection 26, which is received by a guide 27, attached to the casting 3, and bolted to this projection are strong springs or arms 28, which bear against the backs of the two adjacent sections. All of these sections are hollow, and their upper ends are held in contact with the plate 17 by screw-bolts 29 passing through the slots 18, and the sections are supported by the plate 17 when the platform is depressed, since that plate then rests on the plate 19. Within the dome are pipes 30 and 31, which are provided with an inlet and an outlet, and with which the hollow sections 22 and 25 are connected by flexible tubes 32 and 33.

Under the platform 1 is a vertical shaft 34, to which the platform is attached. Near the middle of this shaft is a shoulder 35, and between the shoulder and the under side of the platform is a block 36 in the form of a right prism with square bases, which block turns on the shaft as an axis and is provided with a handle 37.

In the base 2 is a cylindrical chamber containing a piston 38, which is of much greater diameter than the shaft 34, and in this piston is a cavity 39 with a square mouth slightly larger than the bases of the block 36, and with its depth equal to the altitude of the block. The lower part of the shaft 34 extends through the piston 38 and base 2 into the cylinder 40. This cylinder is connected by a channel 41, opening into it a short distance below the top, with the chamber which contains the piston 38, and it has an orifice in its bottom. The shaft 34 and the piston 38 are surrounded by suitable packing. The outer wall of the mold may be heated by causing steam to circulate through the head-block and the sections 22 and 25, and it is for this purpose that the hub 16 is supplied with an inlet and outlet, and the pipes 30 and 31 are placed in the dome and connected with the sections by the flexible tubes, as described. When the platform is a short disance below the greatest height to which it can be raised, the plate 7 is in contact with the lower ends of the sections 22 and 25, while the former 10 projects up into the space inclosed by the sections, the handles $11^2$ of the ring 11 extending underneath and being in contact with the two diametrically-opposite sections in front of and behind the former, and the platform may rest in that position on the block 36 if this is turned so that the corners of the block extend beyond the sides of the cavity in the piston 38, as indicated in Fig. 10. The mold is then ready for the introduction of the pulp. This is forced into the mold through the opening 13 and the channel and openings 12 and 14. After the mold becomes full the cock of the supply-pipe is closed and power is applied to lift the platform. The water entering the cylinder 40 through the orifice in its bottom passes up through the channel 41 and acts against the piston 38, forcing this upward with the block 36 upon it and the platform resting on the block. As the platform rises it lifts the sections 22 and 25, and the sections 22 are driven inward, of course, at the same time by the links 23, and these sections carry with them the sections 25, against which they bear, the plate 17 sliding up the hub 16 of the head-block. The pulp is thus pressed both on the sides and on the top directly against the former, and when the sections 22 and 25 meet the cutting-edge 21 of the plate 19 the pulp is condensed in all places into a thin layer, and the surplus material above the plate 19 is cut off by the edge 21, and the openings 14 are closed by the lower ends of the sections. In this shape the mass is quickly set by the heated surfaces of the mold surrounding it. If the article being made is a pail or tub, the chine will be formed in the rabbet 20 of the plate 19; but in case a chine is not desired the cutting-edge 21 of this plate will be in the same plane as the under surface of the plate. The water squeezed out of the pulp passes into the former and off through a waste-pipe. The platform is next lowered to the position it occupied when the mold was filled, and the sections 22 and 25 also descend and separate from the sides of the newly-formed article, the sections 25 being carried back by the sections 22, acting against the arms 28. By turning the block 36 until it registers with the cavity in the piston 38 the platform will be allowed to descend to the base 2, the block 36 and the lower part of the shaft 34 passing down into the piston 38 and cylinder 40, and the plate 7, with the former and molded article upon it, can then swing out from under the dome. The article may be lifted off the former by means of the ring 11, this being carried outward from the platform by the plate 7, so that the handles of the ring can be readily grasped.

The platform is raised from the base 2 to the position in which it is first supported on the block 36 by the water acting against the lower end of the shaft 34 in the small cylinder 40, and, inasmuch as this furnishes power enough to do the work of lifting the platform, a considerable saving of time can be effected by employing two cylinders arranged and operating as described, instead of a single cylinder, which would need to be of such large size as to render the action of the machine very slow.

While it is not necessary that the mold should be heated to enable articles to be made by it in a satisfactory manner, there is manifestly an advantage to be derived from the setting of the pulp within the mold; yet if in any case the heat is not wanted the sections 22 and 25 and also the top plate may be perforated like the former 10, so that the water will rapidly escape as the pulp is compressed by passing off on both sides. If the sections 22 and 25 and the plate 19 were perforated, the former 10 might be heated instead of these parts, as above described, and by means of two casings fashioned to fit over the former, one of them with and the other without perforations, either a hot or cold mold could be employed in the same machine under the most favorable conditions. In case the outer walls of the mold are perforated as described, air will of course be admitted between the molded article and the sections 22 and 25 and top plate 19, when the platform descends and the sections are retracted so that there will not be any danger then of the rupture of the article from air-pressure, and in case the outer walls are not perforated, but are heated, then the steam generated from the moisture in the pulp will counteract the pressure of the air and prevent rupture of the article.

It will be obvious that articles of various shapes can be produced by a machine constructed and operating substantially in the manner described. Figs. 12 and 13, for instance, illustrate the way in which an oil-can or a battery-jar may be formed. The space inclosed by the sections 22 and 25 is contracted at the base, and a collapsible core consisting of a shaft 42 and sections 43, surrounding it, constitutes the former.

To enable an article with a square or any rectangular cross-section to be made, the several parts composing the mold are formed and arranged as represented in Fig. 14.

The machine is particularly designed for the manufacture of pails, tubs, boxes, oil-cans, battery-cells, milk-pans, trays, and all other articles having the general shape of those named that would be serviceable when made of pulp.

The invention is not limited to a construction embracing exactly eight sections, like the sections 22 and 25, but is intended to include variations of the construction which will produce a like result in practically the same way and by similar mechanism.

Having now described my invention, what I claim as new, and desire to secure by Letters Patent, is—

1. In a pulp-molding machine, the mold having its bottom and inner wall composed of the platform and former, which are moved vertically by suitable power, and its outer wall composed of a stationary head, and a series of sections adapted to rest on the platform surrounding the former and head and to be moved vertically with the platform and former, combined with means for guiding the sections forward and backward, whereby direct pressure against the top and sides of the former can be produced in a mold with rigid walls, substantially as and for the purpose described.

2. In a pulp-molding machine, the combination of the platform, the former fixed thereon, the system of movable sections adapted to rest on the platform surrounding the former and to be lifted by the platform, means by which the sections are forced inward when they are lifted, the head extending down between the upper ends of the sections, a covering for the space between these and the head, and mechanism whereby the platform is raised and lowered, substantially as and for the purpose described.

3. In a pulp-molding-machine, the combination of the platform, the former fixed thereon, the system of movable sections adapted to rest on the platform surrounding the former, a casing or frame inclosing the sections, a series of links or toggles between the sections and frame, arranged to force the sections inward when they are lifted, the head extending down between the upper ends of the sections, a covering for the space between these and the head, and mechanism whereby the platform and with it the sections and former are raised and lowered, substantially as and for the purpose described.

4. In a pulp-molding machine, the combination of a platform, a head above the platform, one of these parts forming the lower and the other the upper end of the mold and one of them having a vertical movement, the former fixed on the platform, a system of movable sections adapted to surround the former and head and to rest on the platform, a casing or frame inclosing the sections, a series of links or toggles between the sections and frame, arranged to be actuated by the moving end of the mold and to force the sections inward, a covering, as the plate 17, for the space between the upper ends of the sections and the head, and mechanism whereby the end of the mold constructed to move is forced toward the opposite end, substantially as and for the purpose described.

5. In a pulp-molding machine, the combination of the platform, the former fixed thereon, the system of movable sections adapted to rest on the platform surrounding the former, a casing or frame inclosing the sections, a series of links or toggles between the sections and frame, arranged to force the sections inward when they are lifted, the head extending down between the upper ends of the sections, the plate 17, arranged to rest on top of the sections and to close the space between these and the head and to slide on the head, and mechanism whereby the platform and with it the sections and former are raised and lowered, substantially as and for the purpose described.

6. In a pulp-molding machine, the combination of the platform, the former fixed thereon, the system of movable sections adapted to rest on the platform surrounding the former and to be lifted by the platform, means by which the sections are forced inward when they are lifted, the head extending down between the upper ends of the sections, the plate 17 on the head, provided with a series of radial slots through which pass bolts 29, connecting the plate to the ends of the movable sections, and mechanism whereby the platform is raised and lowered, substantially as and for the purpose described.

7. In a pulp-molding machine, the combination of an external casing or frame, a series of sections 22, links or toggles connecting these with the frame, a series of sections 25, each inserted between and extending in front of two of the sections 22 and having on the back a projection 26, arms 28, bearing against the sections 22, guides 27 on the frame, adapted to receive the projections 26, a platform on which the sections rest while the article is being molded, and mechanism whereby the platform is raised and lowered, substantially as and for the purpose described.

8. In a pulp-molding machine, the combination of an external casing or frame, a series of sections 22, links 23, pivoted at their inner ends to these sections and at their other ends to the frame and adapted to coact with these as toggles, a series of sections 25, each inserted between and extending in front of two of the sections 22 and having on the back a projection, arms bearing against the sections 22, guides on the frame for the sections 25, a platform on which all the sections rest while the article is being molded, a former on the platform, a head above the former, the plate 17 on the head and on top of the sections, and mechanism whereby the platform is raised and lowered, substantially as and for the purpose described.

9. In a machine for molding pulp, the combination of a platform, a former on the platform, a system of sections constructed and arranged to inclose the former and to contract around it, mechanism whereby the sections are actuated, and a head provided with a plate having a cutting-edge 21 adapted to coact with the faces of the sections for the purpose of removing the surplus material, substantially as described.

10. In a machine for molding pulp, the combination of a platform, a former on the platform, a system of sections constructed and arranged to inclose the former and to contract around it, mechanism whereby the sections are actuated, a head provided with a plate having a cutting-edge 21 adapted to coact with the faces of the sections, and a rabbet 20, whereby a chine may be formed, substantially as described.

11. In a pulp-molding machine, the combination of a platform having an opening or openings 14 therein for the introduction of pulp to the mold, a former on the platform, a system of movable sections adapted to rest on the platform surrounding the former and to contract about it and to recede from it, a top for the mold, and mechanism whereby the sections are actuated, the openings 14 being so located as to be closed by the sections as they slide inward, substantially as described.

12. The lifting mechanism consisting of the combination of the large cylinder containing the piston 38, having a cavity 39 therein wider in one direction than in another, the small cylinder 40, connected near its top with the bottom of the large cylinder by a channel 41, the shaft 34, extending through the piston into the cylinder 40, and the block 36, thicker in one direction than another, corresponding to the cavity 39 and adapted to turn on the shaft as on an axis and to fit into the cavity 39 when it is turned the proper way and when it is turned another way to rest on the top of the piston 38, substantially as and for the purpose described.

MARK L. DEERING.

In presence of—
RUSSELL A. BIGELOW,
MORTIMER V. SMITH.